(12) United States Patent
Herzog

(10) Patent No.: US 10,780,496 B2
(45) Date of Patent: Sep. 22, 2020

(54) DEVICE FOR PRODUCING THREE-DIMENSIONAL OBJECTS

(71) Applicant: CL Schutzrechtsverwaltungs GmbH, Lichtenfels (DE)

(72) Inventor: Frank Herzog, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 626 days.

(21) Appl. No.: 14/653,253

(22) PCT Filed: Nov. 20, 2013

(86) PCT No.: PCT/DE2013/000686
§ 371 (c)(1),
(2) Date: Jun. 17, 2015

(87) PCT Pub. No.: WO2014/111072
PCT Pub. Date: Jul. 24, 2014

(65) Prior Publication Data
US 2015/0336330 A1    Nov. 26, 2015

(30) Foreign Application Priority Data
Jan. 15, 2013 (DE) .................. 10 2013 000 511

(51) Int. Cl.
*B29C 67/00*   (2017.01)
*B22F 3/105*   (2006.01)
(Continued)

(52) U.S. Cl.
CPC .......... *B22F 3/1055* (2013.01); *B29C 64/153* (2017.08); *B29C 64/35* (2017.08);
(Continued)

(58) Field of Classification Search
CPC . B29C 35/0805; B29C 35/0888; B29C 59/02; B29C 59/026
(Continued)

(56) References Cited

U.S. PATENT DOCUMENTS

| 6,401,001 B1 | 6/2002 | Jang et al. |
| 2005/0116391 A1 | 6/2005 | Lindemann et al. |

(Continued)

FOREIGN PATENT DOCUMENTS

| DE | 20107262 U1 | 8/2001 |
| DE | 102007018601 A1 | 10/2008 |

(Continued)

OTHER PUBLICATIONS

International Search Report and Written Opinion for related PCT Application No. PCT/DE2013/000686 dated Jun. 23, 2014.

(Continued)

*Primary Examiner* — Joseph S Del Sole
*Assistant Examiner* — Thu Khanh T Nguyen
(74) *Attorney, Agent, or Firm* — Dority & Manning, P.A.

(57) ABSTRACT

The invention relates to a device (1) for producing three-dimensional objects (12) by successive solidification of layers of a construction material (9, 10) that can be solidified by radiation at the locations corresponding to the respective cross-section of the object (12), said device having a housing, a construction chamber (4) accommodated therein, a dosing chamber (2, 3), an application device (11) for applying layers of the construction material (9, 10) and a conveying element (13, 14, 17, 18, 21, 22, 37, 38) for transporting the construction material (9, 10), wherein at least two conveying elements (13, 17, 21; 14, 18, 22) are provided for transporting different construction materials (9, 10), said conveying elements comprising separate feed lines (37, 38) to at least one dosing chamber (2, 3).

20 Claims, 4 Drawing Sheets

Figure 1:
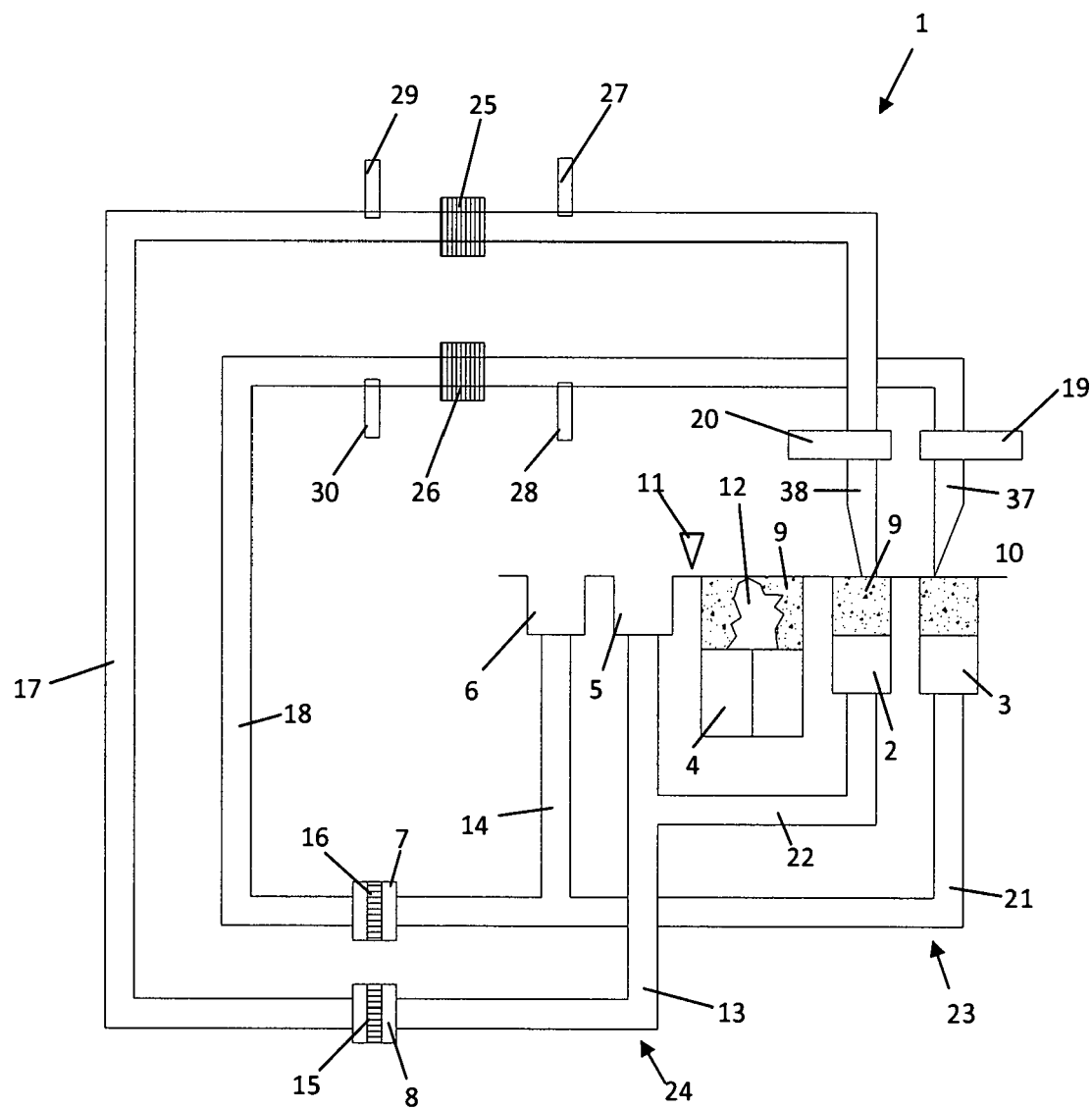

(51) Int. Cl.
*B29C 64/153* (2017.01)
*B29C 64/35* (2017.01)
*B33Y 30/00* (2015.01)
*B29L 9/00* (2006.01)

(52) U.S. Cl.
CPC ............... *B22F 2003/1056* (2013.01); *B22F 2003/1059* (2013.01); *B29L 2009/00* (2013.01); *B33Y 30/00* (2014.12); *Y02P 10/295* (2015.11)

(58) Field of Classification Search
USPC .............................................. 425/385, 174.4
See application file for complete search history.

(56) References Cited

U.S. PATENT DOCUMENTS

2006/0214335 A1* 9/2006 Cox ..................... B29C 64/153
425/375
2010/0140850 A1* 6/2010 Napadensky ......... B29C 64/112
425/174.4
2013/0186514 A1* 7/2013 Zhuang ................. B29C 64/205
141/11
2013/0328228 A1* 12/2013 Pettis .................... B29C 64/393
425/462

FOREIGN PATENT DOCUMENTS

| | | |
|---|---|---|
| DE | 102007029052 A1 | 1/2009 |
| DE | 102011088158 A1 | 6/2013 |
| EP | 1316408 A1 | 6/2003 |
| EP | 1514622 A1 | 3/2005 |
| EP | 1700686 A2 | 9/2006 |

OTHER PUBLICATIONS

International Search Report Corresponding to Application No. PCT/DE2013/000686 dated Jun. 13, 2014.
International Search Authority Written Opinion Corresponding to Application No. PCT/DE2013/000686 dated Jul. 15, 2015.
German Search Results Corresponding to Application No. 102013000511.6 dated Nov. 8, 2016.

* cited by examiner

DEVICE FOR PRODUCING THREE-DIMENSIONAL OBJECTS

CROSS-REFERENCE TO RELATED APPLICATIONS

This application is a United States national stage entry of an International Application serial no. PCT/DE2013/000686 filed Nov. 20, 2013 which claims priority to German Patent Application Ser. No. 102013000511.6 filed Jan. 15, 2013. The contents of these applications are incorporated herein by reference in their entirety as if set forth verbatim.

The invention relates to a device for producing three-dimensional objects according to the features of the preamble of claim 1. Such devices are known under the name selective laser sintering (SLS) device or selective laser melting (SLM) device. The powdery construction material is stored in a dosing chamber, fed into the construction chamber layer by layer by an application device, and the uppermost layer of construction material in each case in the construction chamber is solidified at predetermined locations by a radiation device.

From DE 10 2007 018601 A1 it is known that a conveying device can be provided within the device for transporting the construction material from one or more reservoirs to the dosing chamber.

While it is not shown in DE 10 2007 018601 A1, it is generally known that the construction material can be heated prior to solidification. For this purpose, heaters should be provided below, above or at the sides of the construction chamber.

The heaters as well as other devices for the treatment or control of the construction material should in this case be interpreted in such a way that they are suitable for all construction materials processed in the laser sintering or laser melting plant.

The problem addressed by the invention is therefore that of further developing a device for producing three-dimensional objects having the features of the preamble of claim 1, such that handling and control of the construction material is improved. This problem is solved by the features of claim 1. Advantageous developments of the invention are found in the dependent claims.

The invention is based around the idea that at least one conveying element of the construction material transport circuit, namely the feed lines to the dosing chambers or the dosing chamber, has a redundant configuration such that a separate circuit or partial circuit exists for at least one construction material and a second or several partial circuits for one or more other construction materials. This results in two advantages. Because the conveying elements for this one construction material no longer need to be replaced or cleaned, contaminations of the construction material during transportation are avoided. Secondly, retrofitting and cleaning costs are also reduced, since the conveying elements of at least one construction material no longer need to be replaced.

With regard to a redundant design, two main configurations are conceivable.

First, all elements of a transport circuit may be configured to be redundant. For a first construction material, a separate dosing chamber, reservoir, conveying device, overflow chamber and lines or tubes connecting the same should then be provided. Depending on the construction, individual elements may be omitted or added, the omissions or additions resulting from the basic construction of a laser sintering or laser melting device.

In an alternative design, only the conveying elements, that is, the lines or tubes, are configured to be redundant, while the dosing chamber, overflow chamber, conveying device and powder recovery device must be replaced or cleaned. The elements of a powder circuit that are not conveying elements are hereinafter referred to as construction material reservoirs or powder reservoirs. Replacing and/or cleaning the powder reservoirs is significantly easier than completely replacing an entire transport circuit, which additionally includes the conveying elements. By virtue of being able to interchange or clean the powder reservoirs, it is possible to maintain a compact construction of laser sintering or laser melting devices.

On the other hand, due to the development of replenishing devices, it has become possible to significantly reduce the size of the dosing chamber, for example. The same is also true for the overflow chambers, which are provided with a discharge line and which can therefore be continuously emptied. Without significantly enlarging the total area or total volume of the laser sintering or laser melting plant, it is therefore possible to also design the powder reservoirs to be at least partially redundant. Redundancy means that two or more transporting or conveying elements are available for a transport step of the construction material, for example the transport from a replenishing chamber to a dosing chamber.

Advantageously, a sensor device and/or a construction material treatment device may be arranged on at least one conveying element. Because at least one conveying element is assigned to exactly one construction material, construction material-specific sensor devices and/or construction material treatment devices may be arranged on this conveying element. These may include heating devices, cooling devices, temperature sensors, pressure sensors or even residual oxygen sensors. They may be optimized, depending on the density of the construction material, its transport behavior, its electrical or thermal conductivity.

It is furthermore possible to adapt the shape and/or the material and/or the interior coating of the conveying element to the construction material. For example, if aluminum powder is transported through a conveying element, it must withstand a greater weight than during the transport of a plastic powder. The cross section of a conveying element can also be enlarged if the powder transported therein has a higher tendency to clump than other powders.

The discharge of the construction material also leads to an optimization potential in a redundant arrangement of discharge lines. For example, a conveying element may be provided between an overflow chamber and a powder recovery device, in which a filter is used that is optimized for the construction material to be transported. This filter may also be used instead or in addition in the powder recovery device.

The invention is explained in more detail in the drawings on the basis of embodiments. They show FIG. 1 a device with a closed powder circuit, FIG. 2 rotatable dosing and overflow chambers, FIG. 3 a device with interchangeable powder reservoirs and FIG. 4 connecting elements.

FIG. 1 shows a laser sintering device 1 with dosing chambers 2 and 3, a construction chamber 4, overflow chambers 5 and 6 as well as powder recovery devices 7 and 8. The dosing chambers 2 and 3 hold different construction materials 9 and 10. Via the application device 11, the construction material 9 is transported from the dosing chamber 2, which is located closest to the construction chamber 4, to the construction chamber 4. The uppermost layer of construction material 9 in each case in the construction chamber 4 is solidified with a radiation device (not shown) at the desired locations for producing a three-dimensional object 12. The excess construction material 9 from the construction chamber 4 is collected in the overflow chamber 5. The overflow chamber 5 is that overflow chamber that is located closest to the construction chamber 4. Discharge lines 13 and 14 lead from the overflow chambers 5 and 6 to the powder recovery devices 7 and 8. Discharge lines 13 and 14 are tubes leading from the overflow chambers 5 and 6 to the powder recovery devices 7 and 8, through which the construction material 9 or 10 is transported and which accordingly serve as conveying elements. Located in the powder recovery devices 7 and 8 are construction material-specific filters 15 and 16. If the construction material 9 consists of powder grains having a relatively small average particle diameter, the pore size of the filter 15 can be adjusted to the construction material such that only individual, but not agglomerated, grains pass through. Because the grain diameter of different construction materials as well as that of a single construction material may vary greatly depending on the application purpose, construction material-specific filters can ensure that the recovery of the construction material is optimized. Construction material-specific filters are thus filters where at least one variable of a particular construction material is adjusted, for example filter material, pore size, etc.

In the present invention, different construction materials are understood to be construction materials made of different materials, for example aluminum or platinum, but also construction materials made of the same material having different average grain diameters. For example, aluminum having an average grain diameter of 10 μm exhibits a somewhat different behavior from aluminum having an average grain diameter of 20 μm.

The corresponding suction devices for suctioning off the construction material from the overflow chambers 5 and 6 are not shown, but they are known.

Feed lines 17 and 18 then lead from the powder recovery devices 7 and 8 to the replenishing devices 19 and 20. The dosing chamber 3 is replenished with the replenishing device 19 via the feed line 37, and the dosing chamber 2 with the replenishing device 20 via the feed line 38. In order to return excess construction material from the dosing chambers 2 and 3 after the construction process, corresponding discharge lines 21 and 22 are provided, which also lead to the powder recovery devices 7 and 8.

The laser sintering device 1 thus has a closed powder circuit 24 for the construction material 9, consisting of the dosing chamber 2, the discharge line 22, the overflow chamber 5, the discharge line 13, the powder recovery device 8 with filter 15 and the line 17.

Corresponding devices with the reference characters 3, 21, 6, 14, 7, 16, 18 and 19 are likewise available for the construction material 10 and form the powder circuit 23. These closed powder circuits 23 and 24 offer several advantages.

Because only the construction chamber 4 is removed from the laser sintering device after the construction process, there are no further contaminations within the closed powder circuits 23 and 24. The discharge lines 13 and 22 as well as the line 17 may also be specially adapted to the properties of the construction material 9. The corresponding lines of the powder circuit 23 may likewise be adapted to the construction material 10. It is also possible to install respectively optimized heating devices 25 and 26 or temperature sensors 27 or residual oxygen sensors 29 and 30 for each construction material 9 or 10. In more general terms, due to the redundant design of at least two conveying elements, any sensor devices and/or construction material-treatment devices that are construction material-optimized may be installed at a conveying element. In the most general sense, a redundant design is understood to include at least one conveying element in duplicate, based on its function; hence, that a supply line to a dosing chamber 2 or 3 or a discharge line 21 and 22 or 13 and 14 is present in duplicate, resulting in a separate conveying element for at least one construction material. Depending on the type of application and intended use of the construction materials used in a laser sintering device, the most widely used construction material or most of the construction materials used should be provided with their own feed and discharge lines, while less frequently used construction materials are given their own powder circuit. The respective conveying elements in this powder circuit must then be replaced, which no longer has much of an impact, considering that they are seldom used.

It is thus unnecessary to install a separate powder circuit for each construction material used in a laser sintering device; rather, it is sufficient to provide this for the powders used most frequently.

It is also possible to have two or more construction materials run through a single powder circuit, provided they are similar enough. If two construction materials, as defined above, differ only slightly in their average particle diameter, for example 12 and 15 μm, it is possible to use both of these construction materials in a single powder circuit, for example the powder circuit 23. In fact, possible residues of the one construction material in a conveying element or a powder reservoir do not result in a contamination of the other construction material, but at most in an insignificant increase or decrease of the average grain size.

Figure 2:
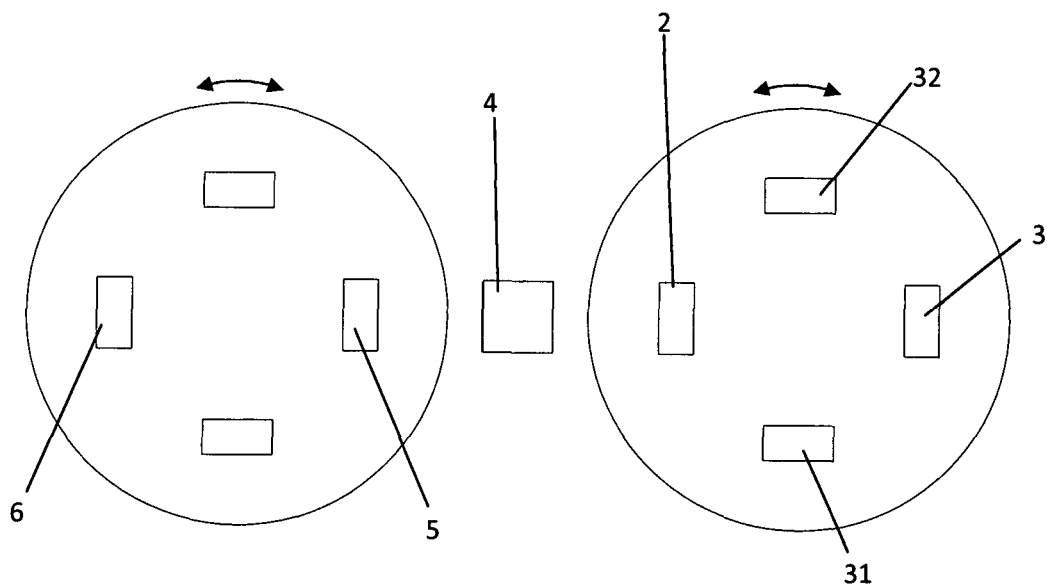

FIG. 2 shows a possible arrangement of dosing chambers and overflow chambers around a construction chamber 4. Here, the dosing chambers 2, 3, 31 and 32 are rotatably mounted on a rotary table, and one of the dosing chambers 2, 3, 31 or 32 in each case can therefore be brought into the vicinity of the construction chamber 4. Possible discharge lines below the dosing chambers 2, 3, 31 and 32 accordingly have a bellows, for example, and can thus be adjusted to a certain length. The rotatability of the rotary table of the dosing chambers 2, 3, 31 and 32 is limited, and the discharge lines are therefore not as strongly twisted or even made to tear. In this manner, it is possible to realize four separate powder circuits. The arrangement, for example of the application device 11, may thus remain constant; only the dosing chamber is shifted in each case when the construction material is replaced.

Figure 3:
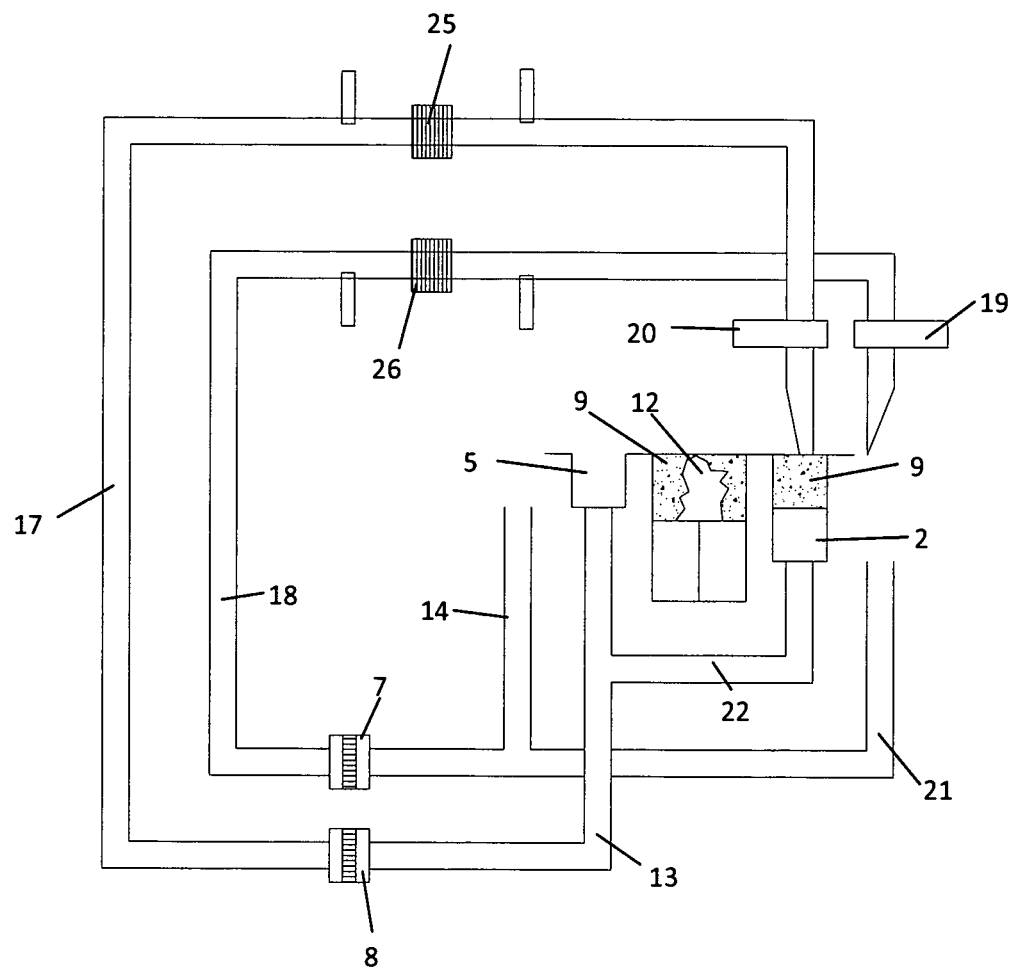

FIG. 3 shows a slightly different construction from FIG. 1, in which only one dosing chamber 2 and one overflow chamber 5 are present in each case. If the construction material 9 is used, the discharge line 13, the powder recovery device 8 with filter 15, the line 17, etc., hence, the conveying elements of the powder circuit 23 according to FIG. 1, are in use. When the construction material is replaced, for instance to hold construction material 10, the overflow chamber 5 and the dosing chamber 2 should be emptied and cleaned. Like the construction chamber 4, the dosing chamber 2 and the overflow chamber 5 may also be completely removed. It is in particular possible to combine the dosing chamber 2, the construction chamber 4 and the overflow chamber 5 into one construction module, which can then be removed as a whole. It is in particular possible to provide a separate construction module for each construction material. The lines 17 and 18 or 21, 22, 13 and 14 must then only be connected to the respective terminals of the dosing chamber 2 or the overflow chamber 5 of a construction module. Replacing conveying elements in the form of feed lines or discharge lines is only necessary if a powder circuit, which is provided for rarely used powders, must be replaced.

Figure 4:
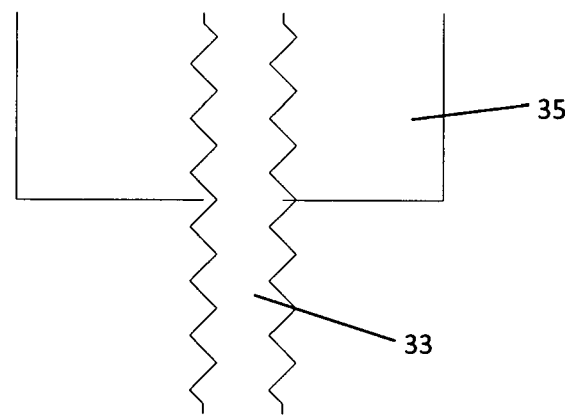
Figure 4:
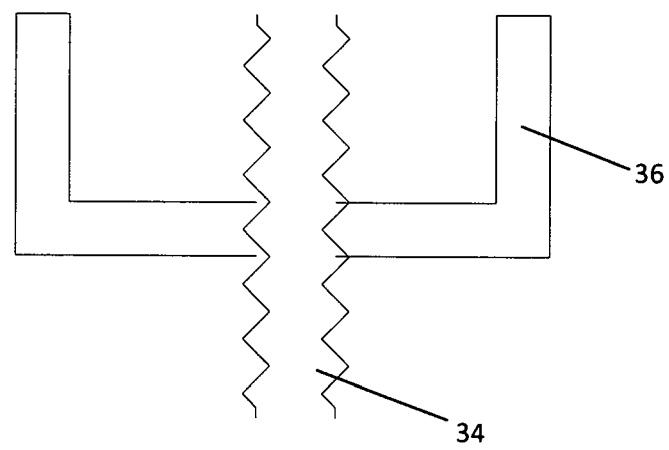

FIG. 4 shows a possible design of connecting elements, with which construction modules, but also individual dosing chambers or overflow chambers, can be assigned to a powder circuit or corresponding conveying elements. For this purpose, it is provided that the connecting elements have a shape such that a conveying element always matches only a single dosing chamber, overflow chamber or construction module. For example, the conveying element may have a female thread 33, and the dosing chamber, overflow chamber or other connecting points a male thread 34. To ensure that only one conveying element, for example of the powder circuit 23, can be connected only to the dosing chamber 3 or a corresponding construction module, the conveying element has a circumferential ring 35 with a square base.

In turn, a corresponding receiving ring 36 is provided on the dosing chamber, into which the circumferential ring 35 fits due to its shape. If other conveying elements have, for example, a circumferential ring with a triangular, circular, elliptical or otherwise shaped cross section instead of a circumferential ring with a square cross section, they do not fit into the receiving ring 36, but only into correspondingly configured receiving rings. This ensures that the powder circuits always remain separated even with interchangeable construction modules or dosing chambers.

LIST OF REFERENCE CHARACTERS

| | |
|---|---|
| 1 | Laser sintering device |
| 2 | Dosing chamber |
| 3 | Dosing chamber |
| 4 | Construction chamber |
| 5 | Overflow chamber |
| 6 | Overflow chamber |
| 7 | Powder recovery device |
| 8 | Powder recovery device |
| 9 | Construction material |
| 10 | Construction material |
| 11 | Application device |
| 12 | Object |
| 13 | Discharge line |
| 14 | Discharge line |
| 15 | Filter |
| 16 | Filter |
| 17 | Line |
| 18 | Line |
| 19 | Replenishing device |
| 20 | Replenishing device |
| 21 | Discharge line |
| 22 | Discharge line |
| 23 | Powder circuit |
| 24 | Powder circuit |
| 25 | Heating device |
| 26 | Heating device |
| 27 | Temperature sensor |
| 28 | Temperature sensor |
| 29 | Residual oxygen sensor |
| 30 | Residual oxygen sensor |
| 31 | Dosing chamber |
| 32 | Dosing chamber |
| 33 | Male thread |
| 34 | Female thread |
| 35 | Circumferential ring |
| 36 | Receiving ring |
| 37 | Feed line |
| 38 | Feed line |

What is claimed is:

1. A system for additively manufacturing three-dimensional objects, the system comprising:
a construction chamber;
a first dosing chamber configured to hold a first construction material;
a second dosing chamber configured to hold a second construction material;
a first powder circuit configured to supply the first construction material to the first dosing chamber;
a second powder circuit configured to supply the second construction material to the second dosing chamber; and
an application device configured to apply successive layers of the first construction material and/or the second construction material to the construction chamber;
wherein the first dosing chamber and the second dosing chamber are alternately positionable in proximity to the construction chamber, and wherein with the first dosing chamber having been alternately positioned in proximity to the construction chamber, the application device is configured to apply the first construction material from the first dosing chamber to the construction chamber, and wherein with the second dosing chamber having been alternately positioned in proximity to the construction chamber, the application device is configured to apply the second construction material from the second dosing chamber to the construction chamber.

2. The system of claim 1, wherein the first construction material and the second construction material have different properties from one another.

3. The system of claim 1, wherein the first powder circuit comprises a first conveying element configured to transport the first construction material; and/or wherein the second powder circuit comprises a second conveying element configured to transport the second construction material.

4. The system of claim 1, wherein the first powder circuit comprises a first feed line configured to supply the first construction material to the first dosing chamber; and/or wherein the second powder circuit comprises a second feed line configured to supply the second construction material to the second dosing chamber.

5. The system of claim 4, wherein the first dosing chamber comprises a first dosing-connecting element comprising a first shape particularly connectable with the first powder circuit and exclusive of the second powder circuit; and/or wherein the second dosing chamber comprises a second dosing-connecting element comprising a second shape particularly connectable with the second powder circuit and exclusive of the first powder circuit.

6. The system of claim 1, wherein the first dosing chamber and the second dosing chamber are interchangeable with one another.

7. The system of claim 1, comprising:
a first overflow chamber; and
a second overflow chamber;
wherein the first overflow chamber and the second overflow chamber are alternately positionable in proximity to the construction chamber, and wherein with the first overflow chamber having been alternately positioned in proximity to the construction chamber, the application device is configured to apply to the first overflow chamber an excess of the first construction material from the first dosing chamber and/or the construction chamber, and wherein with the second overflow chamber having been alternately positioned in proximity to the construction chamber, the application device is configured to apply to the second overflow chamber an excess of the second construction material from the second dosing chamber and/or the construction chamber.

8. The system of claim 1, wherein the first powder circuit comprises a first discharge line; and/or wherein the second powder circuit comprises a second discharge line.

9. The system of claim 8, wherein the first discharge line is configured to receive an excess of the first construction material from a first overflow chamber and/or from the first dosing chamber; and/or wherein the second discharge line is configured to receive an excess of the second construction material from a second overflow chamber and/or from the second dosing chamber.

10. The system of claim 9, wherein the first overflow chamber comprises a first overflow-connecting element comprising a first shape particularly connectable with the first powder circuit and exclusive of the second powder circuit; and/or wherein the second overflow chamber comprises a second overflow-connecting element comprising a second shape particularly connectable with the second powder circuit and exclusive of the first powder circuit.

11. The system of claim 9, wherein the first overflow chamber and the second overflow chamber are interchangeable with one another.

12. The system of claim 1, wherein the first powder circuit comprises a first sensor device and/or a first construction material-treatment device; and/or wherein the second powder circuit comprises a second sensor device and/or a second construction material-treatment device.

13. The system of claim 12, wherein the first sensor device comprises a first temperature sensor, a first pressure sensor, and/or a first residual oxygen sensor; and/or wherein the second sensor device comprises a second temperature sensor, a second pressure sensor, and/or a second residual oxygen sensor.

14. The system of claim 12, wherein the first construction material-treatment device comprises a first heating device and/or a first cooling device; and/or wherein the second construction material-treatment device comprises a second heating device and/or a second cooling device.

15. The system of claim 1, wherein the first powder circuit comprises a first powder recovery device configured specific to the first construction material; and/or wherein the second powder circuit comprises second powder recovery device configured specific to the second construction material.

16. The system of claim 15, wherein the first powder recovery device comprises a first filter configured specific to the first construction material; and/or wherein the second powder recovery device comprises a second filter configured specific to the second construction material.

17. The system of claim 1, wherein the first dosing chamber and the second dosing chamber are rotatably positionable in proximity to the construction chamber.

18. The system of claim 17, wherein the first dosing chamber and the second dosing chamber are mounted on a dosing chamber-rotary table.

19. The system of claim 1, wherein the first overflow chamber and the second overflow chamber are rotatably positionable in proximity to the construction chamber.

20. The system of claim 19, wherein the first overflow chamber and the second overflow chamber are mounted on an overflow chamber-rotary table.

* * * * *